Figure 1:
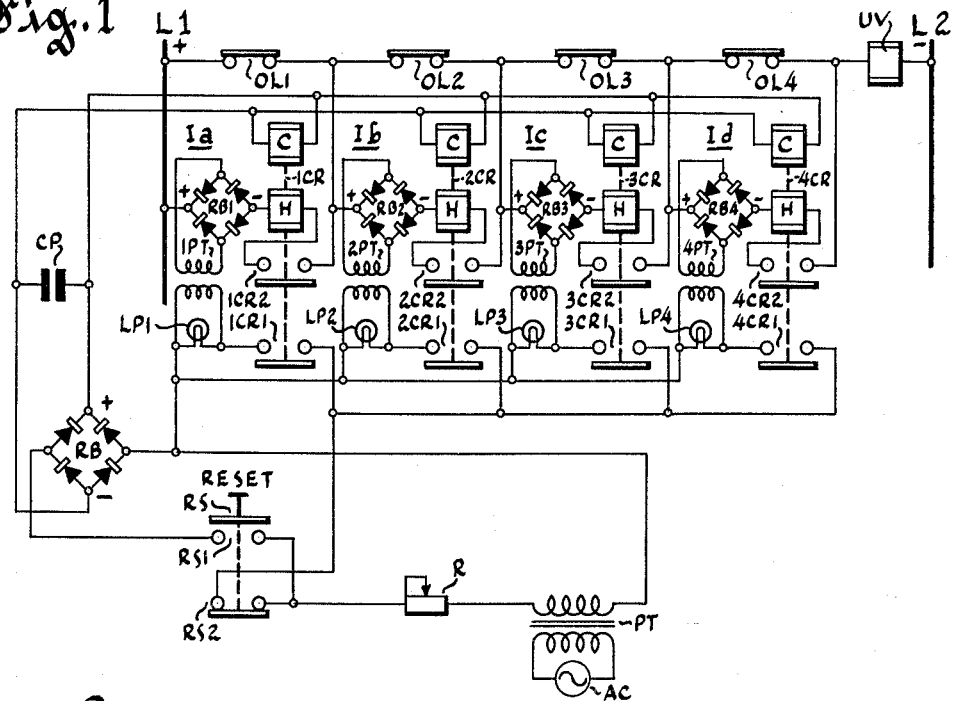

Nov. 28, 1961   R. J. BYRNES   3,011,162
INDICATING SYSTEMS
Filed March 18, 1958

Inventor
Richard J. Byrnes
By H R Ratter
Attorney

United States Patent Office 3,011,162
Patented Nov. 28, 1961

3,011,162
INDICATING SYSTEMS
Richard J. Byrnes, West Allis, Wis., assignor to Cutler-Hammer, Inc., Milwaukee, Wis., a corporation of Delaware
Filed Mar. 18, 1958, Ser. No. 722,344
7 Claims. (Cl. 340—248)

This invention relates to indicating systems and more particularly to systems for indicating the operating conditions of any one or more of a plurality of electrical elements such as protective devices in electrical control networks.

While not limited thereto, the invention is especially applicable to interlocked protective devices in plural motor control networks wherein a plurality of such devices are arranged in series connection, the invention being also applicable to electrically isolated protective devices.

In industrial process lines and the like, it is the usual practice to employ a plurality of electrical motors arranged in sequence and operable to drive the process line at a predetermined speed. This requires interconnection of a plurality of motors of different sizes and involves a plurality of auxiliary circuits any one of which must stop operation of the process line in the event of a faulty condition. Although the number of motors employed in process lines varies over a substantial range, it has been found necessary to arrange the protective devices such as overload and field loss relay contacts, auxiliary limit switches and contacts, etc., in series connection with an undervoltage relay to insure stopping of the entire line when a faulty condition occurs.

Heretofore, difficulties have been encountered in providing a fault indicator capable of responding when one contact in such series protective circuit opens and also responding properly to indicate the respective failures when 10, 50 or 100 contacts open concurrently. When a plurality of contacts open, the voltage drop across each contact decreases to a value that is insufficient to operate the indicator device.

Accordingly, a general object of the invention is to provide improved means to overcome the aforementioned difficulties.

A more specific object of the invention is to provide improved, simple and reliable memory type fault indicating systems for monitoring a multiplicity of protective devices in a plurality of different arrangements.

Another specific object of the invention is to provide improved memory type fault indicating systems for indicating the operating conditions of any one or more of a plurality of serially connected protective devices.

A further specific object of the invention is to provide fault indicating and alarm systems which respond to indicate the operating conditions of protective devices connected in either direct current or alternating current circuits.

Other objects and advantages of the invention will hereinafter appear.

While the apparatus hereinafter described is effectively adapted to fulfill the objects stated, it is to be understood that I do not intend to confine my invention to the particular preferred embodiments of indicating systems disclosed, inasmuch as they are susceptible of various modifications without departing from the scope of the appended claims.

Figure 2:
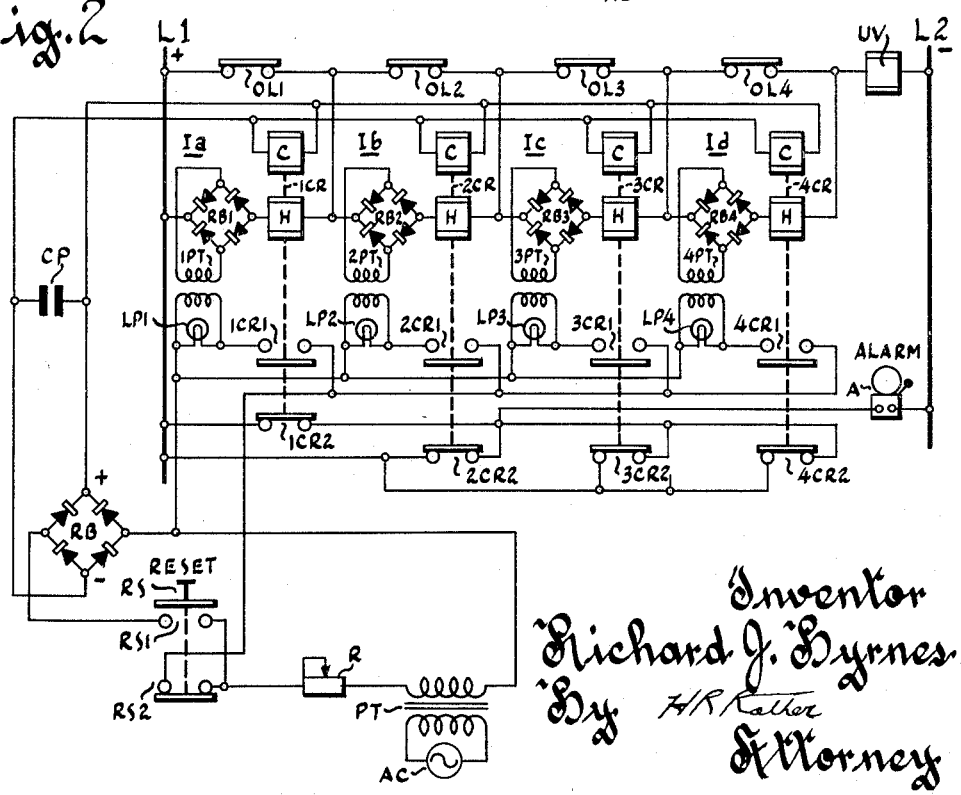

In the drawing, FIGURE 1 diagrammatically shows a visual indicating system constructed in accordance with the invention, and FIG. 2 diagrammatically shows a modification of FIG. 1 including an audible device.

Referring to FIG. 1, there is shown a pair of direct current power supply lines L1 and L2 having connected in series thereacross normally closed overload relay contacts OL1, OL2, OL3 and OL4 and the operating coil of an undervoltage relay UV. These overload contacts are arranged in the usual manner to be opened by corresponding overload relays in response to faulty conditions in respective motor control circuits.

There is also provided a memory type indicating system for indicating momentary or constant opening of any one or more of the overload contacts. The indicating system is provided with a plurality of identical indicator control networks Ia, Ib, Ic and Id corresponding to the number of overload contacts and arranged to indicate the operating conditions of the latter, respectively. Each indicator network is provided with a control relay 1CR, 2CR, 3CR, and 4CR having a closing coil C and a holding coil H. The closing coils C are connected in parallel to the positive and negative output terminals of a full-wave rectifier bridge RB, there being a capacitor CP connected across the output terminals of the bridge for reasons hereinafter described. An alternating current power supply source AC is connected to the input terminals of bridge RB through a transformer PT, an adjustable resistor R and normally open contacts RS1 of a reset switch RS.

Each indicator network is also provided with a series-parallel circuit having a normally open contact 1CR1, 2CR1, 3CR1 and 4CR1 of its control relay in series connection with respectively parallel-connected indicator lamps LP1, LP2, LP3, LP4 and the primary windings of transformers 1PT, 2PT, 3PT and 4PT. The aforementioned series-parallel circuits are connected in parallel to power supply source AC through transformer PT, adjustable resistor R and normally closed contacts RS2 of reset switch RS. The secondary windings of transformers 1PT, 2PT, 3PT and 4PT are connected to the input terminals of respectively associated full-wave rectifier bridges RB1, RB2, RB3 and RB4. The positive and negative output terminals of the latter bridges are connected in series with holding coils H of the aforementioned control relays and normally open maintaining contacts 1CR2, 2CR2, 3CR2 and 4CR2, respectively, across the respectively associated overload relay contacts OL1, OL2, OL3 and OL4.

The operation of the system shown in FIG. 1 will now be described. Let it be assumed that suitable direct current power is supplied to lines L1 and L2 to energize undervoltage relay UV through overload relay contacts OL1–4. As will be apparent, the purpose of the undervoltage relay is to maintain operation of the motors in the process line and to stop all of the motors if one or more of the overload contacts open in response to a faulty condition.

To prepare the indicating system for operation, reset switch RS is momentarily pressed. As a result, contacts RS1 complete energizing circuits for closing coils C of control relays 1CR, 2CR, 3CR and 4CR from supply source AC through transformer PT, resistor R, contacts RS1 and rectifier bridge RB and then through closing coils C in parallel. The system is arranged to insure operation of all the control relays. To this end, when the reset switch is momentarily pressed to energize the closing coils, capacitor CP charges. When the reset switch is released to open contacts RS1, capacitor CP discharges through the closing coils to maintain energization thereof for a predetermined time interval thereby to insure closure of all of the relay contacts. While switch RS is being pressed, contacts RS2 interrupt the circuit from supply source AC to the primary windings of transformers 1PT to 4PT. This prevents the possibility of a build-up of excessive voltages in the primary windings of the transformers before the secondary winding circuits thereof are closed. Thus, this prevents the possibility of excessive voltage build-up across the entire series protective circuit. Since each fault indicator network is in effect a separate power supply source, the voltages add up in series when all the overload contacts are open at the same time. The return path for these voltages is through the power source, for example the power source generator armature, or if an alternating current circuit is being monitored, through the power transformer.

Closing coil C of control relay 1CR in indicator network Ia being thus energized, contacts 1CR1 partially complete an energizing circuit from supply source AC to the primary winding of transformer 1PT and indicator lamp LP1 in parallel, this circuit being, however, maintained open at contacts RS2. Maintaining contacts 1CR2 closed to connect holding coil H of relay 1CR in series with overload contacts OL1 for energization across the output terminals of rectifier bridge RB1 when the reset switch is released. The contacts of the control relays in indicator networks Ib, Ic and Id are similarly closed to condition these networks for operation.

Release of switch RS effects opening of contacts RS1 to disconnect source AC from the closing coils and to discharge capacitor CP as hereinbefore described. Contacts RS2 close to complete energizing circuits from source AC through resistor R and contacts RS2 and then through the aforementioned series-parallel circuits in parallel. As a result, indicator lamps LP1–4 are energized and power is supplied through transformers 1PT, 2PT, 3PT and 4PT and rectifier bridges RB1–4 for energizing the respective holding coils H of the control relays through the associated overload contacts and relay maintaining contacts in series connection. The holding coils maintain the associated relay contacts closed thus to maintain energization of the indicator lamps to indicate that the overload contacts are closed.

Let it be assumed that one or more overload contacts open in response to a faulty condition. Undervoltage relay UV is deenergized to stop all the motors in the process line. Also, the holding coils H associated with the open overload contacts are deenergized to open the respective relay contacts and deenergize the corresponding indicator lamps thereby to indicate the precise cause of the fault. If the fault is cleared and the overload contact recloses, the relay remains deenergized because its maintaining contacts are open. Hence, the corresponding lamp remaining extinguished affords a storage of the fault indication until the system is reset. All the indicator networks are reset simultaneously by pressing switch RS.

It will be apparent that maintaining contacts 1CR2, 2CR2, 3CR2 and 4CR2 could be omitted and the holding coils connected directly to the overload contacts without rendering the system of FIG. 1 inoperative. To this end, the control relays are constructed to require energization of the closing coils to effect closure of the contacts while energization of the holding coils maintains the contacts closed after the closing coils are deenergized. However, the maintaining contact in series with the holding coil affords an additional safety feature to positively insure and maintain restoration of the control relay when a faulty condition occurs.

In the modification shown in FIG. 2, reference characters identical to those of FIG. 1 have been employed to indicate like elements. The modification of FIG. 2 is similar to FIG. 1 except that contacts 1CR2, 2CR2, 3CR2 and 4CR2 which in FIG. 1 are connected in series with the holding coils have been replaced by a direct connection. Instead these contacts are arranged as normally closed contacts connected in parallel with one another for energizing an audible alarm device A across a suitable power supply source such as lines L1 and L2.

In FIG. 2 when reset switch RS is momentarily pressed, closing coils C are energized to close contacts 1CR1, 2CR1, 3CR1 and 4CR1 as hereinbefore described. Contacts 1CR2, 2CR2, 3CR2 and 4CR2 are opened to interrupt the energizing circuits of alarm device A. When a faulty condition occurs to open contacts OL1 for example, contacts 1CR1 open to extinguish lamp LP1 and contacts 1CR2 close to energize alarm device A. When the fault is cleared, reclosing contacts OL1, holding coil H of control relay 1CR is not reenergized from source AC because contacts 1CR1 are open. Holding coil H is not reenergized from lines L1 and L2 because rectifier bridge RB1 blocks the same as hereinafter described.

In FIG. 1 as well as in the modification of FIG. 2, rectifier bridges RB1–4 have been arranged to prevent the power supply source connected to lines L1 and L2 from maintaining the holding coils H energized when the indicating systems are employed in conjunction with direct current protective circuits as shown. To this end, the positive output terminals of the rectifier bridges are preferably connected to positive line L1 to block flow of current from the latter through the holding coils. Also, the holding coil has been provided with resistance of sufficiently high value that opening of an overload contact effects restoration of the corresponding control relay regardless of the polarity of the associated rectifier bridge. The rectified alternating current from source AC maintains energization of the holding coil when the overload contact is closed because this current is impeded only by the resistance of the holding coil. On the other hand, when the overload contact opens to disconnect the rectified current from the holding coil, the power supply source connected to lines L1 and L2 is unable to maintain the control relay because the resistance of the undervoltage relay coil has additionally been inserted in the holding coil circuit. Therefore, the aforementioned blocking effect of the rectifier bridge affords an additional safety feature with the holding coil resistance in FIG. 2 and a further safety feature with the holding coil resistance and contacts 1CR2, 2CR2, 3CR2 and 4CR2 in FIG. 1 to insure restoration of the control relays when faults occur.

The invention is also applicable to monitoring an alternating current protective circuit. Let it be assumed that an alternating current power supply source, source AC if desired, is connected to lines L1 and L2 to energize relay UV when contacts OL1–4 are closed and that the system is reset by momentarily pressing switch RS as hereinbefore described. Referring to FIG. 1, when a fault occurs and contacts OL1 open, the rectified half-cycle wave applied from line L2 through the operating coil of relay UV, contacts OL4, OL3, OL2 and 1CR2, holding coil H and rectifier bridge RB1 to line L1 is insufficient to maintain energization of either relay UV or holding coil H due to the relatively high resistance of the latter and the resistance of relay UV in circuit therewith. As a result, relays UV and 1CR restore. Contacts 1CR1 disconnect source AC from the holding coil and contacts 1CR2 further disconnect the holding coil from source AC as well as from line L2. Thus, when contacts OL1 reclose, relay UV is reenergized but control relay 1CR remains restored until it is reset.

Referring to FIG. 2, let it be assumed that the modification is similarly applied to monitoring an alternating current protective circuit. When a fault occurs and contacts OL1 open, relay UV restores. The rectified half-cycle wave applied from line L2 through the holding coil is insufficient to maintain energization of the latter. As a result, contacts 1CR1 open to disconnect source AC from lamp LP1 and holding coil H, and contacts 1CR2 close to effect energization of alarm device A. Due to the relatively high resistance of holding coil H, relay 1CR remains restored. When the fault is cleared and contacts OL1 reclose, relay UV is reenergized and the aforementioned rectified half-cycle wave by-passes holding coil H to prevent any possibility of reenergization of control relay 1CR. As before, relay 1CR is reset by pressing switch RS.

The invention provides an effectively separate power supply source for each indicator network I*a*–I*d* to afford monitoring of an unlimited number of protective contacts in series connection. While overload contacts have been shown in series connection, it will be apparent that the invention is equally applicable to other and different protective devices electrically isolated from one another or in series connection and to combinations thereof. Any number of indicator networks may be connected in the system in the manner shown for monitoring a corresponding number of protective devices. It will also be apparent that normally closed contacts on the control relays could be employed to illuminate a corresponding indicator lamp when an associated overload contact opens, within the scope of the invention, and that such normally closed contacts could be employed either in place of or in addition to the normally open contacts shown.

I claim:

1. In a memory type fault indication system, the combination with positive and negative power supply conductors and a multiple protection control circuit connected across said conductors comprising a plurality of normally closed contacts connected in series with one another and with an electroresponsive device, of a plurality of indicator control networks each corresponding to a different one of said contacts and connectable in parallel to an alternating current power supply source, each network comprising an indicator device, a relay having a closing coil and a holding coil, and a unidirectional conducting device connecting said holding coil across the corresponding contact, a reset switch, means responsive to momentary operation of said reset switch for energizing said closing coils from said alternating current source, energization of said closing coils effecting operation of said relays to energize said indicator devices and also through the respective unidirectional devices and contacts energizing the holding coils to maintain the energization of said relays, and means responsive to opening of any contact to interrupt energization of the holding coil connected thereto to restore the corresponding relay and deenergize the associated indicator device while the remaining indicator devices remain energized.

2. The invention defined in claim 1, wherein said unidirectional conducting devices are poled to prevent current flow from said positive conductor through said holding coils when said contacts are open.

3. The invention defined in claim 1, and each network further comprising a transformer between the alternating current source and the holding coil, a relay contact in series with said holding coil for closure responsive to operation of the corresponding relay, and a contact for disconnecting said source from the primary winding of said transformer in response to operation of said reset switch until said relay contact has completed the secondary winding circuit of the transformer.

4. In a fault indicating system for indicating the operating conditions of different combinations of a plurality of circuit closing devices connected in series with a controlled electroresponsive device, in combination, a first power supply source for energizing the electroresponsive device through the series connected circuit closing devices, a plurality of indicator control networks respectively connected across said circuit closing devices, each said network having a preset state to which said network may be set when its associated circuit closing device is closed and a passive state corresponding to the open condition of its associated circuit closing device, each said network comprising an indicator device having energized and deenergized conditions for indicating the closed and open conditions of its associated circuit closing device, a second power supply source, a resetting switch having a normally open contact and a normally closed contact, said contacts being connected to said second source, presetting means in each said network responsive to operation of said resetting switch and closure of its normally open contact thereof to set said networks in their preset states, maintaining means in each said network under the control of their associated presetting means and responsive to restoration of said resetting switch and closure of its normally closed contact to maintain said networks in their preset states, said restoration of said resetting switch causing reopening of its normally open contact to render said presetting means of each network thereafter ineffective, said closure of said normally closed contact causing energization of said indicator device in each said network to indicate the closed condition of its associated circuit closing device, and means comprising said maintaining means responsive to opening of different combinations of said circuit closing devices for tripping the respectively associated networks to their tripped positions and for deenergizing the indicator devices of the latter to indicate the open conditions of said combinations of circuit closing devices without altering the preset conditions of the remaining networks.

5. The invention defined in claim 4, together with an energy storage device connected to said normally open contact of said resetting switch and to said presetting means, said energy storage device being effective to store energy from said second source when said normally open contact is closed and to discharge said energy when said normally open contact is reopened to maintain said network in its preset position during the interval between the reopening of said normally open contact and the reclosure of said normally closed contact.

6. In a fault indicating system, a first power supply source, a plurality of normally closed contacts the operating condition of any one or more of which is to be indicated, an electroresponsive device, said contacts being connected in series with said electroresponsive device to maintain energization of the latter across said source, a plurality of indicator control networks respectively associated with said contacts, each said network comprising an indicator device having a first operating condition for indicating the closed condition of its associated contact and a second operating condition for indicating the open condition of its associated contact, each said network further comprising a presetting control device and a maintaining control device, each said maintaining control device being connected in series with its associated contact for energization therethrough, a second power supply source, means comprising a resetting switch effective when operated to connect said second source to energize the presetting control device in each said network, each said network further comprising a circuit control device responsive to energization of the associated presetting control device to partially complete a circuit from said second source to its associated indicator device and maintaining control device, said resetting switch being effective upon restoration thereof to complete said circuits thereby to operate each indicator device to its first operating condition and to energize each maintaining control device to maintain operation of its circuit control device and to disconnect said presetting control devices from said source, each said contact being operable to interrupt the energizing circuit of said electroresponsive device and to interrupt the circuit from said second source to its associated maintaining control device, deenergization of the latter causing operation of the associated indicator device to its second operating condition to indicate the open condition of said contact, and said indicator device remaining in its second operating condition upon reclosure of said contact until said resetting switch is reoperated.

7. The invention defined in claim 6, together with a rectifier device in circuit with each said maintaining control device for blocking current flow therethrough from said first source.

References Cited in the file of this patent
UNITED STATES PATENTS

| | | |
|---|---|---|
| 2,318,364 | Bostwick | May 4, 1943 |
| 2,519,467 | Heidmann | Aug. 22, 1950 |
| 2,645,765 | Bixby | July 14, 1953 |
| 2,900,628 | Fegely et al. | Aug. 18, 1959 |